Dec. 12, 1933.  J. H. DERBY  1,938,583
THERMOSTATIC DEVICE
Filed May 26, 1932
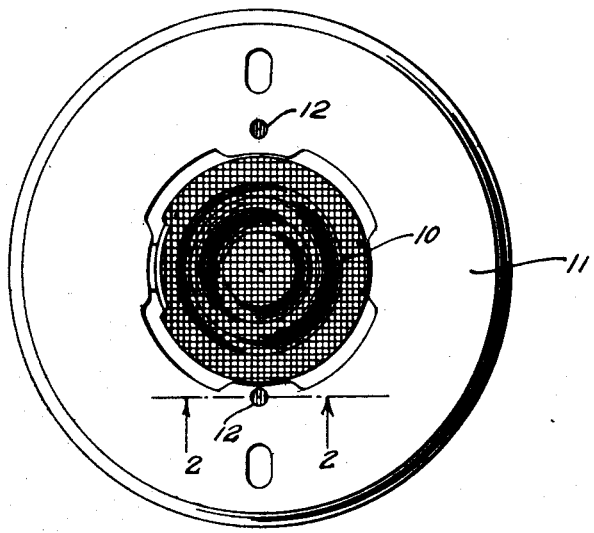
Fig. 1
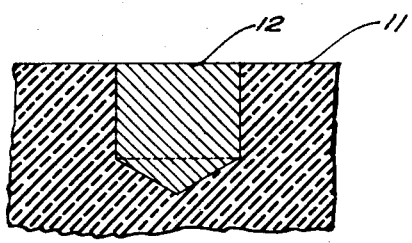
Fig. 2.
Fig. 3.
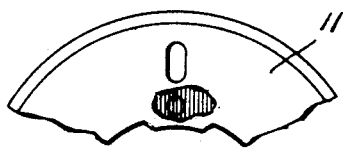
INVENTOR
JOHN H. DERBY.
BY HIS ATTORNEYS Patented Dec. 12, 1933

1,938,583

UNITED STATES PATENT OFFICE 1,938,583

THERMOSTATIC DEVICE

John H. Derby, Scarsdale, N. Y.

Application May 26, 1932. Serial No. 613,629

4 Claims. (Cl. 116—114)

This invention relates to a thermostatic device, and particularly to a thermostatic device which is designed to respond more promptly and surely to a given temperature than other devices of a similar nature, and to give a clear and definite indication when it has been exposed to a predetermined temperature.

Thermostatic devices of various kinds have been mounted in various positions and for various purposes to respond to predetermined temperatures and to control electrical circuits and mechanical devices of all kinds. These have, for the most part, been designed to operate by heat received by convection or conduction, and too little attention has been paid to radiated heat in the operation of such devices. I have now found that, for most purposes, the radiant heat is no less important than the heat received by conduction and convection, particularly in the case of fire alarm and other fire control or prevention devices. It is extremely desirable to utilize the radiant heat in the operation of the thermostatic devices in such a way that these devices may be operated more certainly and quickly in case of fire. This is particularly important, for example, where there may be a draft or where, from any cause, the convected heat from a blaze is deflected away from the thermostatic device.

Accordingly, it is an object of the present invention to so design a thermostatic device that it will readily and efficiently absorb radiant heat, so that its temperature may be raised above that of the surrounding atmosphere and wall. Another object of the invention is to provide indicating means which will give definite and easily recognizable indication when the device has been subjected to a temperature which would cause it to operate.

With these and other objects in view, my invention comprises a thermostatic device having its temperature-responsive element provided with a surface which is an efficient absorber of radiant heat, and advantageously surrounding the heat-absorbing element with a substantial area over which the surface is adapted to reflect radiant heat with little or no absorption. Advantageously the thermostatic device of my invention further includes a piece of fusible material secured to the device near the temperature-responsive element, and of color contrasting with its surroundings and fusible at a temperature such that it will be melted at, and preferably below, the temperature which causes the device to operate.

In the accompanying drawing,

Fig. 1 shows in plan view one type of thermostatic element constructed according to my invention;

Fig. 2 is an enlarged fragmentary cross-section taken on line 2—2 of Fig. 1.

Fig. 3 is a fragmentary view of the device shown in full in Fig. 1, after it has been exposed to heat sufficient to operate the device.

In the drawing, a central temperature-responsive element 10 is shown, which may be, for example, that described and claimed in my application Serial No. 452,895, filed May 16, 1930. This thermostatic device comprises a pair of electrodes insulated from each other, the exposed one of which has on its inner surface a disc of fusible metal which, when fused, flows into contact with the second electrode and closes the circuit thereto. Such thermostatic devices have commonly been mounted in a central opening in an annular disc 11 of insulating material, for example, a synthetic resin impregnated material. As commonly constructed prior to my invention, this annular disc has been made of black, or other dark material. I have now discovered that a very much more efficient and quicker operation of the device can be obtained if this annular disc is provided with a surface adapted to reflect radiant heat and to minimize absorption. Thus, by actual tests, it has been demonstrated that a thermostatic device of this type, with a black annular insulating disc 11 and an exposed reflecting metal electrode 10, may be made to operate 5% to 10% quicker when exposed to the same conditions, if the electrode is painted black. If, however, the annular ring is then covered with a white or ivory enamel and exposed to the same conditions, the operation will be 20% to 25% quicker than with the original device. The reason for this is not readily apparent, but that it is true has been demonstrated beyond doubt.

In the preferred embodiment of the invention shown in the drawing, I have provided, in the annular ring 11 close to the electrode 10, a hole 12 which is filled with a fusible material, preferably a wax or similar material, which displays a color in contrast to that of the annular disc 11. Preferably, also, the surface of this wax filling is adapted to absorb radiant heat, as is the exposed surface of the electrode 10. This wax or other material in the filling 12 will be melted before operation of the thermostatic device, and its absence will therefore give a definite and easily recognizable indication that the device has been operated.

Advantageously the wax or other fusible material in the filling 12 carries a die which is adapted to strike into the surface which surrounds the hole 12 so that when, upon fusion, the wax runs out over the surrounding surface, e. g., as illustrated in Fig. 3, the latter will be permanently colored in a way to provide a clearly recognizable indication that the device has been operated, and this color indication cannot be removed even by cleaning off the wax or other fusible material.

This is particularly important with the type of thermostatic device shown, because these devices when once operated, continue to form a conducting circuit which will continue to give the alarm until the device has been replaced. Ordinarily, a number of these devices in one part of a building will be connected together in parallel in the circuit, so that even though a characteristic signal be given for different parts of the building, there may still be considerable difficulty in discovering the particular device which has been operated. Furthermore, if a signal is given and no fire is discovered, the blame is likely to be placed upon the thermostatic device and it is likely to be regarded as defective, whereas it frequently happens that heat from stoves, furnaces, steam, electric heaters, or other heat producing means, affects the fusible material, causing a false alarm; or someone may even have experimented by holding a match close to the thermostatic device. In any of these cases, the melting of the wax would give a clear indication that the device had been operated by the required degree of heat and had not given a false alarm because of defective materials or construction in the thermostatic device itself.

Although it is possible to attach the indicating fusible material to the surface of the electrode 10 itself, this is not desirable, both because it tends to cut down the heat-receiving surface of the electrode, and because the fusing of the wax requires a substantial amount of heat, which must be taken from that which otherwise would have served to operate the thermostatic device. On the other hand, it is desirable to have the fusible indicating piece 12 as close as possible to the electrode 10, so that it will be substantially impossible to operate the electrode without also fusing this indicating piece.

Although I have shown the fusible indicator 12 as filling a small hole, e. g., about ⅛ of an inch in diameter, and ⅛ or 1/16 of an inch deep, and adapted to flow out from the hole when fused, it will be understood that it may be in any other form, e. g., it may be in the form of a small lump on the surface of the annular disc, and may be designed to spread to a larger diameter when fused. And although I am aware that many other materials may be used instead of wax—in fact, any material which will permanently change its appearance at the given temperature so as to give a clear and easily distinguishable indication, whether by fusion, by chemical change, or in any other manner,— nevertheless, I have found the die-carrying fusible material so far superior as to be strongly recommended for my purpose.

Many other changes and modifications than those specifically mentioned above may be made without departing from the principle and the scope of this invention, and the above description is given only as illustrative of the invention, and is not intended in any way to limit its scope.

What I claim is:

1. A thermostatic device comprising a temperature-responsive element having a heat-absorbing surface and means surrounding said heat-absorbing surface adapted to reflect heat therefrom.

2. A thermostatic device as defined in claim 1, in which the temperature-responsive element is a disc, and the means surrounding it is an annular disc in approximately the same plane.

3. A thermostatic device as defined in claim 1, in which a piece of a fusible material is secured to said device near said temperature-responsive element, and is provided with a surface adapted to absorb radiant heat and exhibiting a color in contrast to that of the part of the device to which it is secured, said material being adapted to fuse at a temperature near, but not more than, that at which said temperature-responsive device responds.

4. A thermostatic device comprising a temperature-responsive element for use in an exposed location, a piece of fusible material of color contrasting with its surroundings positioned closely adjacent to said temperature-responsive element and fusible at a temperature near, but not above, that at which said temperature-responsive element responds.

JOHN H. DERBY.